March 30, 1937.
H. E. IVES
2,075,523
SCANNING DEVICE
Filed Dec. 1, 1933
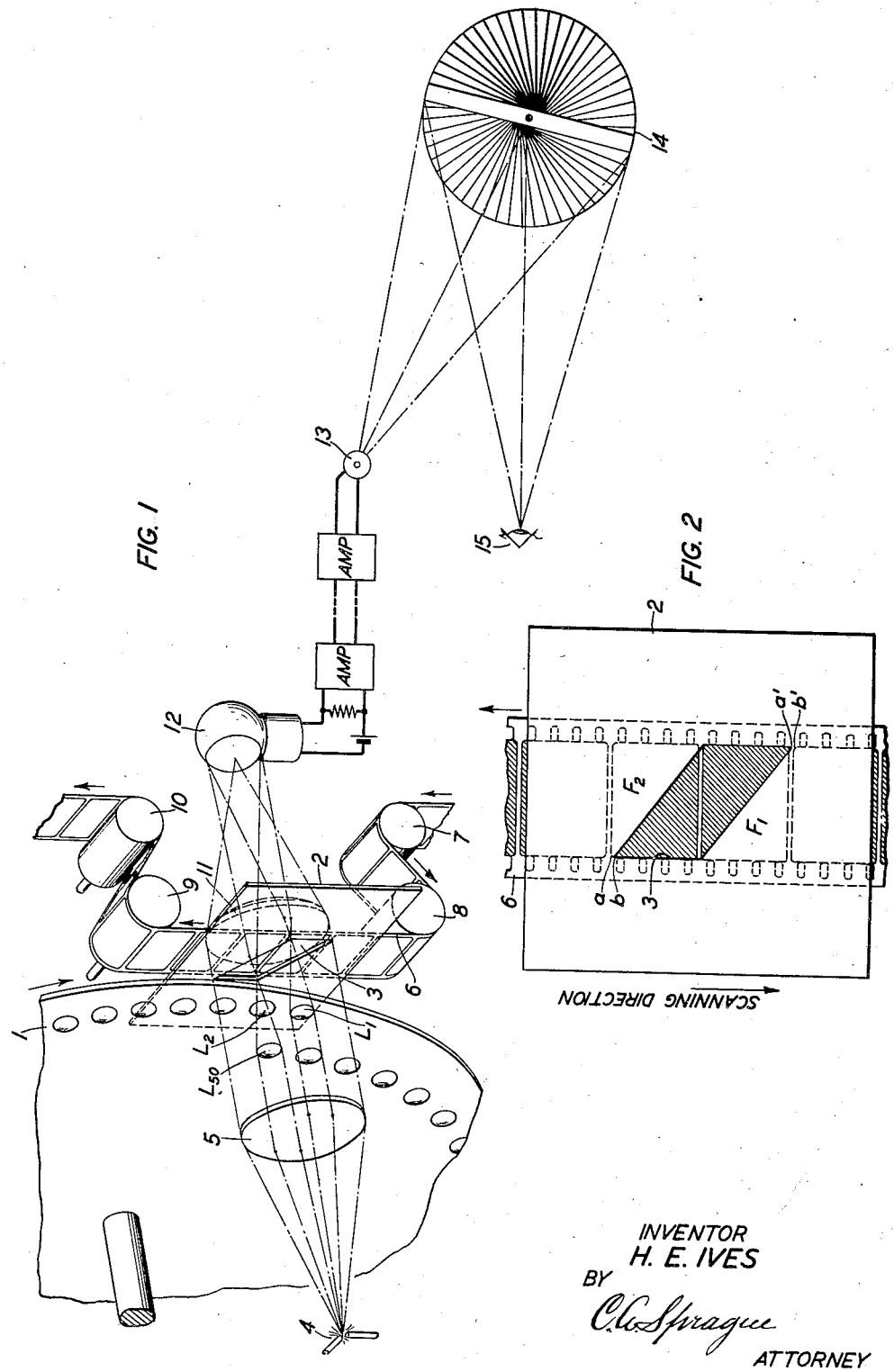
INVENTOR
H. E. IVES
BY
C. C. Sprague
ATTORNEY Patented Mar. 30, 1937

2,075,523

UNITED STATES PATENT OFFICE 2,075,523

SCANNING DEVICE

Herbert E. Ives, Montclair, N. J., assignor to Bell Telephone Laboratories, Incorporated, New York, N. Y., a corporation of New York Application December 1, 1933, Serial No. 700,413

6 Claims. (Cl. 178—6)

This invention relates to scanning devices and more particularly to television and the scanning of motion picture film or other strip material.

It is often desirable to successively optically scan the frames of a motion picture film element by element and to convert the light from the film into correspondingly modulated currents to control the production of a similar film at the same place or at a distant station or to control the production of a succession of transient images corresponding to the representations upon the film. In one well known form of television system a motion picture is taken of the field of view and is immediately developed and scanned to produce the image currents for transmission. At the receiving station these currents may be used directly to build up optical images or may control the reproduction of the film from which such images may be projected upon a screen.

The most feasible method of scanning motion picture film for television thus far has been to move the film continuously past a narrow slot or the equivalent extending across the film and to scan the film exposed by the slot with a slotted scanning disc, or equivalent apparatus, whereby the picture is scanned in elemental lines or strips transverse to the film. The movement of the film is relied upon to position the lines, that is, to effect the scanning in the direction of the film movement.

It sometimes becomes highly desirable to employ a receiving device which builds up the image in vertical rather than horizontal strips. Such apparatus can not be used with the motion picture film scanning apparatus heretofore employed, in which each frame is scanned in lines transverse to the sides of the film—that is, in the horizontal direction in the picture. For example, considering the mirror helix as a receiving device, it has been found that it is advantageous in many ways to rotate the helix about a horizontal axis whereby the scanning lines are vertical. In order to receive motion picture film on such a helix it becomes necessary to scan the film in what is ordinarily the direction of motion of the film, that is, vertical. One scheme which might be adopted is to print the film frames by projection printing with the frames turned through 90° from their ordinary position. This, however, involves special printing and would be particularly undesirable where sound film is to be used. Another alternative would be to give up the continuous motion of the film, reverting to the intermittent motion and scanning each frame while it is standing still. A serious disadvantage with this is that the shutter interval occasions loss in transmission time and also involves a special receiver which is not suitable for images received from objects ordinarily scanned.

An object of this invention is to provide an improved method of and apparatus for scanning motion picture film or other strip material.

In accordance with the invention, provision is made for scanning a continuously advancing motion picture film or similar strip material in a direction transverse to the strip, whereby the resultant image currents may be utilized at a receiving station with apparatus which builds up images in vertical lines.

One embodiment of the invention, chosen as illustrative, is fully described below with detailed reference to the accompanying drawing. However, for the purpose of first making clear the principles of the invention this arrangement will here be briefly described. At the transmitting station the film to be scanned is continuously advanced vertically upward by any suitable mechanism. The scanning device comprises a disc with a spiral or holes or preferably with a spiral of lenses for use in combination with a stationary collimating lens and a point light source. Between the disc and the film and closely adjacent the latter is a baffle plate provided with a warped or diamond shaped aperture or window. As the disc rotates, beams of light produced by the lenses of the disc in combination with the collimating lens cross the window in succession in parallel paths which preferably overlap by the slight amount necessary to reduce the lined appearance of the image to a minimum. The vertical dimension of the window is not the height of one frame of a motion picture film but is greater or less than this by an amount equal to the distance the film travels during the scanning of one vertical strip of the frame; greater if the film and disc travel in the same direction and less if they travel in opposite directions; and the other dimension of the window is similarly affected by a change in the relative direction of movement. During each complete scanning cycle the film is advanced a distance equal to the vertical dimension of a frame plus the width of a space between frames. The first and last lens of the spiral of lenses on the disc are radially aligned. As the result of this arrangement in combination with the properly shaped and dimensioned window the scanning of the first line of a frame begins at the instant that the scanning of the last line of the preceding frame is completed. The modulated beams of light emerging from the film pass through a second converging lens which directs them to a photoelectric cell.

Although the arrangement just described was designed primarily for use with a mirror helix at the receiving station, it is also adapted to work with other scanning apparatus including an arrangement similar to itself in which the photoelectric cell and second lens are omitted and the scanning light is modulated in any well known manner under control of the incoming image currents and directed to an unexposed film.

This type of scanning device has the advantage over others heretofore used to scan continuously moving film in that the disc itself, or whatever scanning device is used, is at the same time adapted to scan stationary rectangular fields, thus reducing the amount of apparatus needed to fully equip a television station. In such case the first or last lens of the series may be masked.

It is obvious that the invention may take various other forms. For example, the film may be scanned by reflection methods or by scanning its image and also an arrangement utilizing a scanning cylinder rather than a disc may be used with the scanned portion of the film either in a plane or curved.

A somewhat more complete description of the illustrative embodiment of the invention will now be given, with reference to the accompanying drawing, in which Fig. 1 is a showing of the apparatus in part diagrammatically and in part in perspective; and Fig. 2 is an enlarged view of the scanning aperture or window in its relation to the film.

Scanning disc 1 is provided with a plurality of apertures arranged in a spiral row and carrying a lens in association with each aperture. Adjacent one side of the disc and in a plane parallel thereto is a light baffle 2 containing a window 3. Light from a source 4 falls upon collimating lens 5 to form an emerging beam of substantially parallel rays with its axis passing through the center of window 3. A motion picture film 6, or other strip material to be scanned, is moved at a uniform velocity in the direction of the arrow over rollers 7, 8, 9 and 10 by any suitable mechanism, not shown, so that a portion of the film at each instant is adjacent window 3 and in a plane substantially parallel to baffle 2. It will be obvious that any other suitable means may be used for effecting this movement of the film past the window at uniform velocity. The horizontal dimension of the window is preferably equal to or slightly less than the horizontal dimension of a frame of the motion picture film, and the vertical sides of the window are, therefore, substantially aligned with the sides of the picture tract of the film where it passes the window. The other two sides of the window nearly but not quite coincide with parallel diagonals of successive frames of the film whenever portions of two frames only of the film are opposite the window. The reason for not having the sides of the window exactly coincide with the diagonals of successive frames is explained below. Each lens of the disc 1 as it passes through the beam produced by lens 5 gathers parallel rays from this beam and focuses them in the region of the film and thus forms a scanning beam which traverses the window and the film in the rear thereof in a vertical elemental strip. At the instant that one of these beams passes off the window a succeeding beam enters the window and this process is continued until the entire area of the window is scanned in vertical elemental strips. Meanwhile the film is progressing past the window at such a rate that the scanning paths on the film during a complete scanning cycle are horizontally aligned and the phase relation between the disc and the film is such that these paths together cover a frame of the film. Assume, for example, that the film 6 is moving upward, the disc is rotating in the direction of the arrow, and each frame is to be scanned in fifty elemental strips. At the instant that the beam from lens $L_1$ begins to scan frame $F_1$ the beam from lens $L_{50}$ is passing downward off frame $F_2$. At the instant the beam from lens $L_1$ completes this traversal of the window the beam from lens $L_2$ enters the window. While the first right-hand strip of the window (see Fig. 2) is being scanned the film moves upward by such an amount that the upper boundary of frame $F_1$ intersects the upper side of the window in line with the second elemental strip from the right. This process is continued throughout each complete scanning period. It is preferred to have each elemental scanning strip extend not only across the frame but also across the intervening non-pictorial portion between this and the succeeding or preceding frame. The dimension of the window in the vertical direction is, however, not the vertical distance across a frame and an adjacent non-pictorial portion, but is less than this distance by the distance that the film travels during a line scanning period, assuming the film to move in a direction opposite to the direction of scanning. If the movement of film and the scanning are in the same direction the vertical dimension of the window will be greater than the vertical distance across a frame and an adjacent non-pictorial section by the distance that the film travels during a line scanning period. This difference in these two vertical dimensions is indicated (but not to scale) at $a$, $b$ and $a'$, $b'$, Fig. 2.

Converging lens 11 receives the light transmitted through the film and directs it to photoelectric cell 12. The beams from lens 11 may be either converging or diverging. As shown in the drawing these beams have a divergence less than the convergence of the beams incident upon the film and about sufficient to fill the aperture of cell 12. It is necessary, of course, to have the beams of such size as they enter the cell that all of the light thereof will reach the cathode throughout each scanning period.

The photoelectric currents thus produced are amplified and transmitted to the receiving point where, after further amplification, they are impressed upon a strip light source 13 placed in a horizontal position. The rotating mirror helix 14 receives light from source 13 and each mirror facet in turn sweeps a diverging beam of light across the eye of the observer 15. As one of these beams completes its sweep across the region where the eye is placed the succeeding beam enters this region. The rotation of the mirror helix 14 is synchronized with that of disc 1 by any suitable apparatus, not shown. Since the beams from the helix are at each instant modulated in accordance with the modulation of the scanning beam at the transmitting station the observer sees images of the successive frames of the motion picture film, which images appear to be at the mirror helix. For a more detailed description of a mirror helix such as is here diagrammatically shown, reference is made to the application of Frank Gray for Scanning apparatus, Serial No. 539,463, filed May 23, 1931.

It will be noted that, whereas in the ordinary arrangement employing a scanning disc carrying lenses the radial spacing of the first and last lenses of the series is the same as the radial spacing of each other two adjacent lenses. In the arrangement herein illustrated the first and last lenses of the series lie on the same radius of the disc. Moreover in the arrangement shown the spacing between lenses must be somewhat less than the vertical dimension of a frame of the film. If in a similar arrangement the scanning beam is caused to move in a direction opposite to that of the film the spacing between lenses is slightly more than the vertical dimension of a frame and the angular spacing of the first and last lenses of the series is twice that of any other two successive lenses.

As previously pointed out herein the arrangement described for scanning a motion picture film or other strip material in successive scannings parallel to the sides of the strip is merely illustrative. The scope of the invention is defined by the appended claims. While an object of the invention is the provision of apparatus for use at a transmitting station which enables a continuously moving film to be scanned in such direction that the resulting image currents may be used with a device which builds up the images in vertical elemental strips, such transmitting apparatus is also adapted to work with other scanning apparatus as will readily be seen. If desired, synchronizing impulses may be transmitted from one station to the other at the beginning or end of each line scanning period while the scanning beam traverses (or would otherwise traverse) a non-pictorial section between frames of the film. Various other modifications may obviously be made without departing from the spirit and bounds of the invention, the scope of the invention being defined by the appended claims.

What is claimed is:

1. Means for scanning strip material comprising means for advancing the strip in the direction of its length at uniform speed, a window extending obliquely across the strip, and means comprising a moving scanning device for completely scanning successive transverse portions of the strip, one at a time, through said window in parallel elemental lines extending lengthwise of the strip, said scanning device having a row of spirally arranged apertures the terminal ones of which are differently positioned with respect to each other in the direction of the spiral than are any other successively operated apertures of the spiral.

2. Means for scanning strip material comprising means for advancing the strip in the direction of its length at uniform speed, a window extending obliquely across the strip, and means comprising a rotatable scanning device carrying a spirally arranged row of lenses for completely scanning successive equal transverse portions of the strip, one at a time, through said window in parallel elemental lines extending lengthwise of the strip.

3. Means for scanning strip material comprising means for advancing the strip in the direction of its length at uniform speed, a window extending obliquely across the strip, and means for completely scanning successive equal transverse portions of the strip, one at a time, through said window in parallel elemental strips extending lengthwise of the strip comprising a rotatable scanning member carrying a spirally arranged row of lenses, means for projecting a beam of parallel light rays toward said film through said window, and means for rotating said member so that said lenses successively enter said beam and focus the received light in the region of said film.

4. Means for scanning strip material comprising a light baffle having a window with two substantially parallel sides, means for moving successive portions of said strip material past said window at uniform velocity and in a direction oblique to said sides of said window, and means for successively directing light in parallel paths extending across said window from one of said sides thereof to the other in a direction substantially the same as or opposite to that in which said strip material moves, said light directing means comprising a rotating scanning device having a row of apertures the terminal ones of which are differently positioned with respect to each other in the direction of said row than are any other successively operated apertures of the row.

5. Means for scanning motion picture film having consecutive pictorial frames separated by intervening non-pictorial strips comprising means for advancing the film in the direction of its length at uniform speed, a window extending obliquely across the film, and means for completely scanning successive frames of said film, one at a time, through said window in parallel elemental lines extending lengthwise of the film in a direction opposite to the movement of said film by a scanning beam which but for the window would scan regions outside the area within the window, the dimension of the window in a direction along the film being equal to the distance along the film occupied by one frame and one strip minus the distance the film travels during a line scanning period.

6. Means for scanning motion picture film having consecutive pictorial frames separated by intervening non-pictorial strips comprising means for advancing the film in the direction of its length at uniform speed, a window extending obliquely across the film, and means for completely scanning successive frames of said film, one at a time, through said window in parallel elemental lines extending lengthwise of the film in the direction of the movement of said film by a scanning beam which but for the window would scan regions outside the area within the window, the dimension of the window in the direction along the film being equal to the distance along the film occupied by one frame and one strip plus the distance the film travels during a line scanning period.

HERBERT E. IVES.